④ United States Patent [11] 3,603,938

[72] Inventor Thomas S. Cooper
Burlington, Vt.
[21] Appl. No. 837,451
[22] Filed June 30, 1969
[45] Patented Sept. 7, 1971
[73] Assignee International Business Machines Corporation
Armonk, N.Y.

[54] DRIVE SYSTEM FOR A MEMORY ARRAY
2 Claims, 2 Drawing Figs.

[52] U.S. Cl. .......... 340/174 M, 340/174 TB, 340/174 LA
[51] Int. Cl. .......... G11c 7/00, G11c 5/02
[50] Field of Search .......... 340/173, 174

[56] References Cited
UNITED STATES PATENTS

| | | | |
|---|---|---|---|
| 3,164,810 | 1/1965 | Harding .......... | 340/174 |
| 3,445,831 | 5/1969 | Cooper, et al. .......... | 340/174 |
| 3,522,593 | 8/1970 | Hsieh et al. .......... | 340/174 |

*Primary Examiner*—Stanley M. Urynowicz, Jr.
*Attorney*—Sughrue, Rothwell, Mion, Zinn & Macpeak ABSTRACT: A drive system for a magnetic core array is disclosed which employs transistor switches for selectively applying the energizing currents to the drive lines. The transistor switches are in the form of floating, nonsaturating switches of the type disclosed in U.S. Pat. No. 3,289,008. The secondary windings of power supply transformers provide the sole source of energizing current for the drive lines. This isolates the drive lines from the direct current power supplies thereby minimizing the coupling of currents from the drive lines to the sense lines. The selected transistor switches are turned on to complete series circuits through their respective drive lines prior to application of a square wave voltage pulse applied to the drive lines by the pulse or power transformers. The voltage pulse provided by the power supply transformer is removed a short time prior to the turning off of the transistors. This eliminates the transistor breakdown problem and affords a significant reduction in power consumption. Each transistor switch is used for both read and write operations. This is accomplished by providing isolation diodes which are back biased by the power supply transformers to isolate the commoned collectors and emitters of the switching transistors and thereby prevent current flow in an undesired path. There is thus afforded a substantial reduction in the number of transistors and coupling transformers required in the drive system.

INVENTOR
THOMAS S. COOPER

BY Sughrue, Rothwell, Mion, Zinn & Macpeak
ATTORNEYS

DRIVE SYSTEM FOR A MEMORY ARRAY

BACKGROUND OF THE INVENTION

1. Field of the Invention

This application generally relates to an improved drive system for a memory array, and more particularly to an improved direct drive system using floating, nonsaturating transistor switches associated with the drive lines of a magnetic core array wherein each transistor switch is used for both read and write operations. While the drive system is disclosed and described in combination with a magnetic core array, it may be used to equal advantage in any memory array of the type in which bistable elements are arranged in rows and columns. The references hereinafter to a magnetic core array are, therefore, merely by way of example.

2. Description of the Prior Art

In the past, many different core array drive schemes have been proposed, one of which is frequently referred to as a "direct drive system." One form of the direct drive system is illustrated in U.S. Pat. No. 3,192,510, issued June 29, 1965, to R. J. Flaherty, entitled "Gated Diode Selection Drive System."

In a typical array, cores which exhibit a square loop hysteresis characteristic are arranged in rows and columns; and drive means associated therewith address selected groups of the cores in the array. Each row and each column of the cores has a drive line to which bipolar read and write currents are applied. A source of read and write currents is selectively applied to the drive lines by way of switches to set the cores to one or the other of two stable states upon the coincident read and write energization of row and column drive lines common to the cores.

In data processing apparatus using magnetic cores as storage, transistors are typically used as switches for selectively applying the energizing currents to the drive lines. This type of direct drive system has been found to be one of the most economical designs for main storage sections of data processing apparatus. In these storage devices, inhibit drive lines are used in conjunction with the row and column drive lines described above for selective energization of each core in a predetermined group of cores associated with a pair of row and column drive lines during the WRITE cycle.

Space and packaging considerations in the design of core arrays necessitate the further arrangement of the cores in a three-dimensional array. That is, the cores are first arranged in a plurality of vertically spaced parallel planes, each plane having the cores further arranged in said rows and columns as described above. Unfortunately, this three-dimensional arrangement of the cores gives rise to much more serious noise problems in the sense lines associated with the array than arises with the use of a two-dimensional array. In a two-dimensional array, the cores can be arranged in a single plane, and a ground plane can be placed immediately adjacent each and every one of the cores. This two-dimensional array with the adjacent ground plane minimizes the stray capacitance and noise problems associated with this capacitance. However, it is exceedingly difficult to provide a completely suitable ground plane arrangement with a three-dimensional array; and, in addition, the stray capacitance associated with the three-dimensional array is greater than that of the two-dimensional array.

Consequently, in the storage devices of data processing apparatus, severe noise problems are encountered. The direct drive system indicated above is an extremely economical design; but previous known designs have not been as reliable as is the more expensive, load-sharing core matrix drive systems. The decreased reliability of the direct drive systems has been due primarily to the existence of the significant stray capacitances in the three-dimensional as well as two-dimensional core arrays together with the ground feedback paths through the sense lines and sense amplifiers of the array for noise which is produced by the drive system itself.

In the earlier direct drive systems, the power supply has been in the form of one or more direct current power supplies. A modification introduced into the earlier direct drive systems to minimize noise and thereby improve reliability was the use of two completely separate direct current power supplies of equal and opposite potentials connected to opposite ends of the drive lines and their associated transistor switches to "balance" the array around ground. For a perfectly "balanced" drive, the current into one side of the array is identical to that out of the other side. This means that the drive causes no net current in the sense windings. This use of two supplies did somewhat improve the reliability and decrease the noise problems. However, it is not completely satisfactory because a complete balancing effect is not achieved. The array impedances, timing skews and the power supplies give rise to imbalance.

At least a part of the noise problem can be minimized by decreasing the rise and fall times of the drive current pulses. However, in order to decrease said rise and fall times, it would be normally necessary to increase the potential levels of the power supplies. This gives rise to serious transistor breakdown problems. There are maximum potential limits which can be applied in a practical system because unduly high potentials require the use of expensive transistor switches which can tolerate such high voltages without breakdown. Keeping in mind that the number of switches in any large storage device is extremely high, it can be appreciated that a practical storage system cannot utilize expensive transistor switches.

The foregoing disadvantages have been overcome in a direct drive system disclosed in U.S. Pat. No. 3,445,831, issued on May 20, 1969, to Thomas S. Cooper and David E. Norton and assigned to the assignee of the present application. Said Cooper et al. patent is hereby incorporated herein by reference as if it were set forth in its entirety.

In the Cooper et al. patent, the direct connection of direct current supply potentials to the drive line circuit is completely eliminated. Instead, the secondary windings of power supply transformers provide a sole source of energizing current for the drive line; and this current is connected to the drive lines by the series connected transistor switches of the direct drive system. The supply transformers are selected so as to provide a fast current rise time, the only limitation being that the cost of the transformers be compatible with the overall cost which can be provided in the storage device of this type.

The transistor switches in the Cooper et al. system are in the form of floating nonsaturating switches of the type disclosed in U.S. Pat. No. 3,289,008 issued to Edward H. Sommerfield on Nov. 29, 1966. Briefly, the Sommerfield switch includes a coupling transformer as the sole source of energizing current for its base-emitter circuit. The transformer includes a primary winding, a secondary winding connected across the base-emitter electrodes, and an additional secondary winding connected across the emitter-collector electrodes. A diode is connected in series with said additional winding. During turn-on the diode becomes forward biased as the transistor approaches saturation to maintain the voltage of said additional winding across the emitter-collector electrodes, thereby inhibiting operation in the region of saturation. When the diode forward biases, the base current falls to a level which is a small fraction of its initial turn-on valve. The Sommerfield switch therefore provides rapid turn-on with an initial base current overdrive. It is also especially advantageous because its emitter electrode is "floating"; and turn-on of the transistor is assured irrespective of the voltage level at the emitter electrode.

The combination of the transformers which form the sole source of power for the drive currents in the array and the transformer coupled switches provide complete isolation of the drive lines from the direct current power supplies in the Cooper et al. system. This minimizes the coupling of current from the drive lines to the sense lines because there is no reference which is common to both the drive and the sense lines. This arrangement, therefore, approaches the desired equalization of the drive currents into the array and the drive currents out of the array.

The Cooper et al. drive system is controlled so that the selected transistor switches are turned on to complete series circuits through their respective drive lines prior to the application of a square wave voltage pulse applied to the drive lines by the pulse or power transformers. The supply transformers apply their voltage pulses to the drive lines and transistor switch circuits a short time after the transistors turn on, for example, 25 nanoseconds. Thus, when the turn-on pulses are applied to the base-emitter electrodes of the transistor switches, the transistors immediately enter a region of saturation since there is no collector supply potential. This eliminates the transistor breakdown problem because the collector-to-emitter voltages are applied only after the transistors are turned on to their low impedance state. The voltage pulse provided by the power supply transformer is removed a short time prior to the turning-off of the transistors, for example, 25 nanoseconds. There is a significant reduction in power consumption as a result of the turning-on and turning-off of the transistor switches with no collector-to-emitter operating potential supplied. As a result, smaller transistors can be used and, because of the smaller interelectrode capacitance, the smaller transistors can assure a high turn-on, turnoff and operating speed.

SUMMARY OF THE INVENTION

The present invention relates to an improvement in the Cooper et al. system just described and has for its object the provision of a drive system for a memory array which has all of the advantages of the Cooper et al. drive system and in addition, realizes significant additional economies in construction. This is accomplished by using each transistor switch for both read and write operations. Thus, the number of transistor switches and associated coupling transformers may be reduced by as much as one-half over the Cooper et al. system. To do this, isolation diodes are provided which are back biased by the secondary windings of the power supply transformers to prevent current flow in an undesired or "sneak" path, and thereby isolate the commoned collectors and emitters of the transistors. In other words, two diodes are used for each transistor and associated coupling transformer replaced.

BRIEF DESCRIPTION OF THE DRAWINGS

The specific nature of the invention as well as other objects, aspects, uses and advantages thereof, will clearly appear from the following description and from the accompanying drawing, in which.

DESCRIPTION OF THE PREFERRED EMBODIMENTS

While only the row switches are described in illustrating the preferred embodiment, it is to be expressly understood that the column switches would be connected in an identical manner and that the invention can be practiced in a three-dimensional array as well as a two-dimensional array. For a fuller understanding of the overall system to which the present invention is directed, reference should be had to the above-mentioned Cooper et al. patent.

Figure 1A:
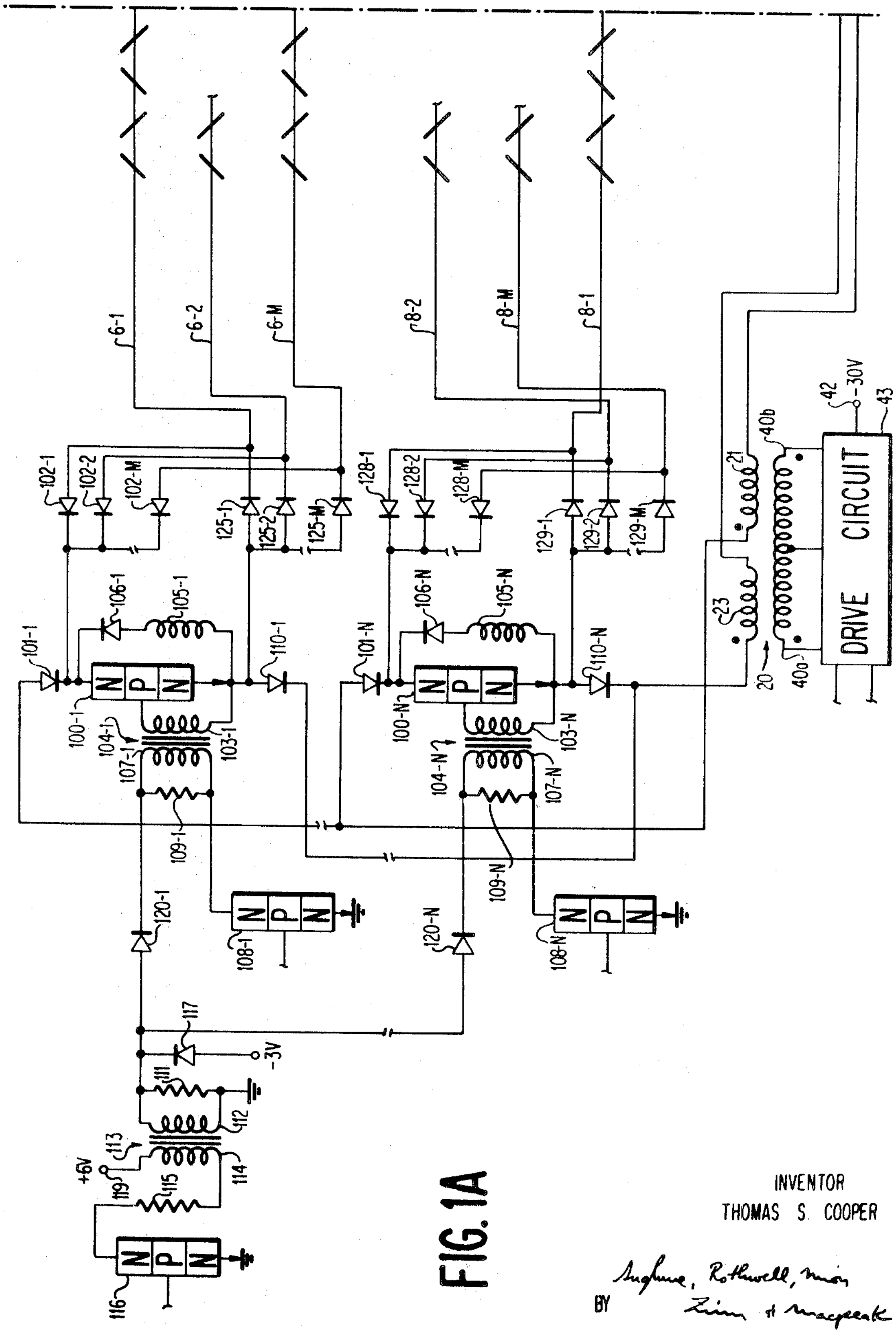
FIGS. 1A and 1B are fragmentary schematic diagrams which, when taken together, show the row switches of a single plane in a magnetic core array and illustrate the connection of said switches according to the present invention.
Figure 1B:
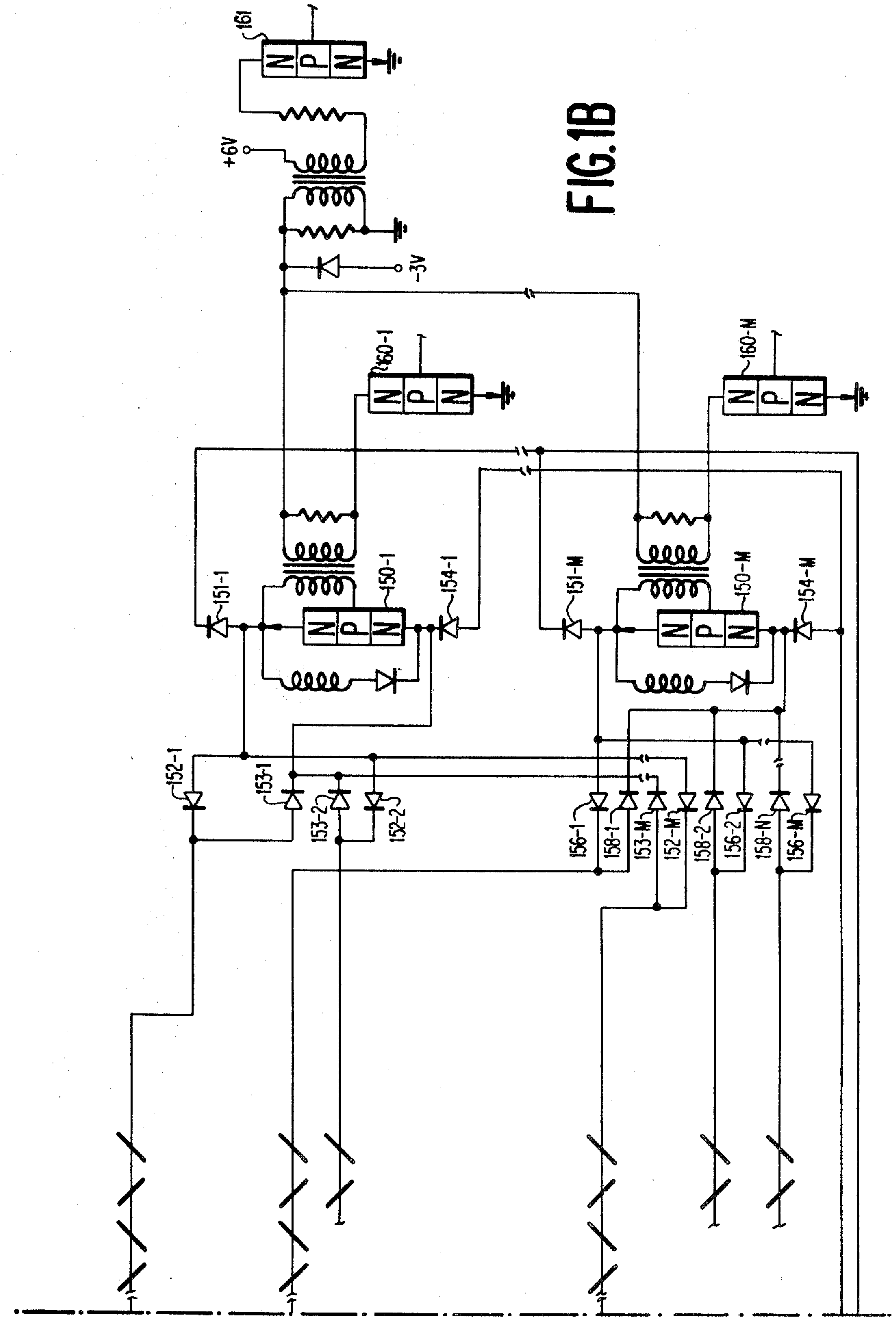

As shown in FIGS. 1A and 1B, a power transformer 20 has a first secondary winding 21 connected to the row switches 100–1 to 100–N and 150–1 to 150–M. A second secondary winding 23 is connected to these same row switches and together with the secondary winding 21 provides the sole source of read and write energizing current for the row drive lines 6–1 to 6–M and 8–1 to 8–M. The transformer 20 includes a center-tapped primary winding 40*a* and 40*b* having the center-tap terminal thereof connected to a negative supply terminal 42 by way of a drive circuit 43.

One terminal of the secondary winding 21 of the transformer 20 is connected to each of the row switches 100–1 to 100–N through collector isolating diodes 101–1 to 101–N. The other terminal of the secondary winding 21 is connected to each of the row switches 150–1 to 150–N through similar isolating emitter diodes 151–1 to 151–M.

Similarly, one terminal of the secondary winding 23 of transformer 20 is connected to each of the switches 100–1 through 100–N by way of emitter isolating diodes 110–1 to 110–N; and the other terminal of secondary winding 23 is connected to each of the switches 150–1 to 150–M through collector isolating diodes 154–1 to 154–M. Thus, the transformer 20 provides the power for the read and write currents for the row drive lines.

Each read/write switch includes a single transistor switch preferably of the type described in the above said Sommerfield patent. Specifically, the transistor 100–1 has its collector electrode connected to secondary winding 21 through collector isolating diode 101–1 and its emitter electrode connected to secondary winding 23 through emitter isolating diode 110–1. In addition, transistor 100–1 has its collector electrode connected to row drive lines 6–1 to 6–M by way of diodes 102–1 to 102–M. The emitter electrode of transistor 100–1 is also connected to row drive lines 6–1 to 6–M by way of diodes 125–1 to 125–M.

The secondary winding 103–1 of a transformer 104–1 is connected across the base-emitter electrodes of the transistor 100–1. An additional secondary winding 105–1 and a diode 106–1 are connected across the emitter-collector electrodes of the transistor 100–1. The transformer 104–1 carries a primary winding 107–1 having one terminal thereof connected to ground potential by way of a transistor gate 108–1. A resistor 109–1 is connected in shunt with the primary winding 107–1. The other terminal of winding 107–1 is connected to ground potential by way of a diode 120–1 and a resistor 111.

The secondary winding 112 of a transformer 113 is connected across the resistor 111. The transformer 113 includes the primary winding 114 connected to a positive supply terminal 119 and to ground potential by way of a resistor 115 and a transistor driver 116. A diode 117 connects the junction of the diode 120–1 and the resistor 111 to a negative supply terminal to limit the negative potential swings in the winding 112. Energization of the gate 108–1 and the driver 116 produces a pulse in the primary winding 107–1 and energizes the driver switch 100–1 to its low impedance state.

The transistor switch 100–N is connected in identically the same manner as just described for transistor 100–1 except that the collector electrode of transistor 100–N is connected to a different group of row drive lines 8–1 to 8–M through diodes 128–1 to 128–M. The emitter electrode of transistor 100–N is in a similar manner connected to the drive lines 8–1 to 8–M through diodes 129–1 to 129–M.

The primary winding 107–N of transformer 104–N has one terminal thereof connected to ground potential by way of a transistor gate 108–N. A resistor 109–N is connected in shunt with the primary winding 107–N. The other terminal of the winding 107–N is connected to ground potential by way of diode 120–N and resistor 111. Thus, energization of the gate 108–N and the driver 116 produces a pulse in the primary winding 107–N and energizes the driver switch 100–N to its low impedance state.

Transistor switches 150–1 to 150–M are connected in exactly the same manner as the transistor switches 100–1 to 100–N. In this case, however, the emitter electrode of transistor 150–1, for example, is connected by way of diodes 152–1 to 152–M to the first row drive line 8–1. Transistor 150–M has its emitter electrode with each of the transistors 100–1 to 100–N. In a similar manner, the collector electrode of transistor 150–1 is connected by way of diodes 153–1 to 153–M to each of the first drive lines associated with the transistor switches 100–1 to 100–N. As a specific example, the diodes 152–1 and 153–1 connect the emitter electrode and the collector electrode, respectively, of transistor 150–1 to drive line 6–1 while the diodes 152–M and 153–M connect the emitter and collector electrodes of transistor 150–1 to drive lines 8–1. Transistor 150–M has its emitter electrode connected to the drive lines associated with each of the transistors 100–1 to 100–N by way of diodes 156–1 to 156–M. Similarly, the collector electrode of transistor 150–M is connected to the drive lines associated with the transistors 100–1 to 100–N through diodes 158–1 to 158–N. As a specific example, the emitter and collector electrodes of transistor 150–M are connected to the drive line 6–M through diodes 156–1 and 158–1, respectively.

Energization of the driver transistor switches 150–1 through 150–M is effected by the coincident energization of respective transistor gates 160–1 to 260–M and a transistor driver 161. For example, coincident energization of the driver 161 and gate 160–1 energizes the transistor switch 150–1.

The operation of the circuits of FIGS. 1A and 1B will now be described with respect to the selection of drive line 6–1. It will be understood that the selection of a particular core on the drive line 6–1 is attained by a similar operation of the column drive circuits, not shown. Addressing circuits (not shown) will cause a coincident energization of the driver 116 and the gate 108–1 to energize the base-emitter circuit of the transistor switch 100–1. At the same time, the addressing circuits will cause a coincident energization of the driver 161 and gate 160–1 to energize the base-emitter circuit of the switch 150–1. In the preferred embodiment, the transformer 20 has not yet been driven when the switches 100–1 and 150–1 are turned on and these switches turn on very rapidly since they are not under load. The switches assume their low impedance conditions completing a series circuit for the drive line 6–1. This circuit extends from the secondary winding 21 through the diode 101–1, the switch 100–1, the diode 125–1, the row drive line 6–1, the diode 153–1, the transistor switch 150–1 and the diode 151–1 to the other terminal of secondary winding 21.

Twenty-five nanoseconds after the switches 100–1 and 150–1 are turned on, a pulse is applied to the drive circuit 43 to produce a square wave pulse in the primary winding 40*a* of the transformer 20. This produces a square wave pulse in secondary windings 21 and 23. It should be noted that the polarity of secondary windings 21 and 23 assure that diodes 101–1 through 101–N and diodes 151–1 through 151–M are forward biased and diodes 110–1 through 110–N and diodes 154–1 through 154–M are reverse biased. The pulse produced in secondary winding 21 is applied to the drive line 6–1 over the circuit described above. Reverse biased diode 110–1 prevents a current flow in a sneak path through diode 110–1, secondary winding 23, diode 154–1, transistor 150–1, diode 151–1, and back to secondary winding 21. This voltage pulse produces half-select write current in the drive line.

After a predetermined time interval, the drive circuit 43 is turned off to terminate the pulse in secondary windings 21 and 23.

A read cycle will now be described with respect to the same row drive line 6–1, it being assumed that the selected core on the drive line has been set to its logical "1" state by the preceding write cycle.

The driver 116 and the gate 108–1 are again energized to turn on the transistor switch 100–1 to its low impedance state, and the driver 161 and gate 160–1 are energized to turn on the transistor switch 150–1 to its low impedance state. This completes a circuit for the row drive line 6–1 through the switches 100–1 and 150–1 and their diodes 102–1, 152–1, 110–1, and 154–1 to the secondary winding 23 of transformer 20. Twenty-five nanoseconds after the switches 100–1 and 150–1 are turned on, a pulse is applied to the drive circuit 43 to energize primary winding 40*b*. This produced a square wave voltage pulse in secondary windings 23 and 21 that is opposite in polarity from that produced for write current described above. This pulse in the secondary winding produces a half-select read current in the drive line 6–1. Diodes 101–1 through 101–N and diodes 151–1 through 151–M are reverse biased and diodes 110–1 through 110–N and diodes 154–1 through 154–M are forward biased. Reverse biased diode 151–1 prevents a current flow in a sneak path through diode 151–1, secondary winding 21, diode 101–1, transistor 100–1, diode 110–1, to secondary winding 23. This read current will switch the selected core on the drive line 6–1 to its initial stable state, thereby producing an output pulse in the sense line (not shown).

After a predetermined time interval, the energizing circuit for the transformer 20 is opened to terminate the voltage pulse in secondary windings 23 and 21.

It will be appreciated that the circuit illustrated achieves a significant reduction in the number of drive transistor switches and associated coupling transformers since each transistor switch is used for both the read and the write cycles. This has been achieved through the use of collector and emitter back biased isolating diodes for each of the drive transistor switches.

It should be understood that a single transistor switch with its associated two diodes in accordance with the invention may be used on only one side of the drive lines, and two transistors used on the other side. These two transistors would be arranged as shown in the Cooper et al. patent. With this embodiment, there are no possible sneak paths. In the embodiment of the invention shown in FIGS. 1A and 1B, only one drive transformer with two secondary windings and one center tap primary winding with its associated drive circuitry for selectively driving one-half or the other of the primary, is necessary.

While the invention has been particularly shown and described with reference to a preferred embodiment thereof, it will be understood that various modifications can be made in construction and the arrangement within the scope of the invention as defined in the appended claims.

What is claimed is:

1. In a memory array including bistable memory elements arranged in rows and columns, row and column drive lines threading the memory elements for selectively addressing them within the array, electronic switch means operable to selectively establish series circuits through the switch means and drive lines for the application of bipolar read and write currents to the drive lines to enter binary data into and read binary data from the memory elements, and transformer means including secondary winding means connected to opposite ends of the series circuits formed by the switch means and the drive lines and constituting the sole source of energizing current for said drive lines, the improvement wherein at least one of said switch means is an individual switch used to establish series circuits during both the write and the read cycles, and further comprising isolation means connected to said individual switch to permit the energizing current to flow in a first direction through drive lines connected to said switch while blocking current flow in an undesired path during the write cycle, and to permit the energizing current to flow in the opposite direction through said drive lines while blocking current flow in an undesired path during the read cycle.

2. A memory array as recited in claim 1 wherein:

a. each individual switch is a transistor, b. the secondary winding means includes a read winding and a write winding, c. the isolation means includes a first diode connected to the emitter of each transistor and a second diode connected to the collector of each transistor, and d. means connecting the read and write windings to opposite diodes in each transistor.

UNITED STATES PATENT OFFICE
CERTIFICATE OF CORRECTION

Patent No. 3,603,938 Dated September 7, 1971

Inventor(s) Thomas S. Cooper

It is certified that error appears in the above-identified patent and that said Letters Patent are hereby corrected as shown below:

Column 4, lines 68 and 69, "8-1. Transistor 150-M has its emitter electrode" should read -- associated --. Column 5, line 14, "260-M" should read -- 160-M --.

Signed and sealed this 11th day of April 1972.

(SEAL)
Attest:

EDWARD M.FLETCHER,JR.
Attesting Officer

ROBERT GOTTSCHALK
Commissioner of Patents

ℝM PO-1050 (10-69)

USCOMM-DC 60376-P69
☆ U.S. GOVERNMENT PRINTING OFFICE : 1969 O—366-334